United States Patent [19]

Suga

[11] Patent Number: 5,198,890
[45] Date of Patent: Mar. 30, 1993

[54] WHITE BALANCE CORRECTING DEVICE FOR AN IMAGE SENSING

[75] Inventor: Akira Suga, Tokyo, Japan

[73] Assignee: Canon Kabushiki Kaisha, Tokyo, Japan

[21] Appl. No.: 857,111

[22] Filed: Mar. 24, 1992

Related U.S. Application Data

[63] Continuation of Ser. No. 499,895, Mar. 27, 1990, abandoned.

[30] Foreign Application Priority Data

Mar. 30, 1989 [JP] Japan .................. 1-076569

[51] Int. Cl.$^5$ .............................. H04N 9/73
[52] U.S. Cl. ................................. 358/29
[58] Field of Search ......................... 358/29

[56] References Cited

U.S. PATENT DOCUMENTS

| 4,646,161 | 2/1987 | Tsuchiya et al. | 358/29 C |
| 4,875,100 | 10/1989 | Yonemoto et al. | 358/213.19 |

FOREIGN PATENT DOCUMENTS

| 61876 | 5/1981 | Japan | 358/29 C |
| 97284 | 6/1982 | Japan | 358/29 |
| 123287 | 7/1983 | Japan | 358/29 |
| 212067 | 10/1985 | Japan | 358/29 C |
| 4389 | 1/1986 | Japan | 358/29 |

Primary Examiner—John W. Shepperd
Attorney, Agent, or Firm—Robin, Blecker, Daley & Driscoll

[57] ABSTRACT

An image sensing apparatus comprises a color image sensor which produces a time-sequential image signal which sequentially includes a plurality of color components, and a color temperature sensor which is independent of the color image sensor and produces a time-sequential sensed signal which sequentially includes a plurality of color components corresponding to the plurality of color components of the time-sequential image signal produced by the image sensor. A processor selectively processes the time-sequential image signal produced by the color image sensor and the time-sequential sensed signal produced by the color temperature sensor. White balance control circuitry controls the white balance of color signals output from the color image sensor which have been obtained through the processing means on the basis of outputs of the color temperture sensor which have been obtained through the processing means.

20 Claims, 7 Drawing Sheets

WHITE BALANCE CORRECTING DEVICE FOR AN IMAGE SENSING

This is a continuation of prior application Ser. No. 499,895, filed Mar. 27, 1990, now abandoned.

BACKGROUND OF THE INVENTION

1. Field of the Invention

This invention relates to white balance correcting devices for video cameras, electronic still cameras or like image sensing apparatuses.

2. Description of the Related Art

In recent years, solid-state image sensors such as a CCD, from the output of which are obtained a luminance signal and color signals, i.e., so-called color solid-state imaging techniques, are coming into ever wider use. With this it is of great importance to insure establishment of the white balance so that regardless of any light source under which a white object is imaged, as the image signal of that object is separated into three primary colors, the ratio of the three color signals, i.e., the R (Red), G (Green) and B (Blue) ones, becomes 1:1:1.

It is known to provide a method of obtaining this white balance by making use of a sensor for detecting the color temperature of the light source, that is, for producing white balance information, as arranged in separation from the sensor which produces image information of the object so that the white balance of the object image can be controlled in accordance with the output of the white balance sensor. Because both sensors differ from each other, the spectral characteristic of the three colors obtained from the white balance sensor does not match with that of the three colors obtained from the solid-state image sensor. This discrepancy must be perfectly removed. Otherwise, the correct white balance could not be made under any type of light source. The color filters to be used with the solid-state image sensor, however, are, for example, ones of four colors including the complementary colors, as is often the case. Therefore, the same dyes as those used in the sensor for white balance cannot be used. Hence, it is quite difficult to match the aforesaid two spectral characteristics with each other. For this reason, it has been difficult to insure that the white balance is maintained with high accuracy over a wide variety of types of light sources.

It is also known to provide another method of obtaining white balance information, which method obviates the necessity of using the additional sensor for white balance by regarding the average value of the image information obtained from the image sensor as white. In this case, there is no problem of the aforesaid discrepancy of the spectral characteristics. But, of the objects which may be encountered, there are some which do not allow the average value to be regarded as white. Thus, the intrinsic color of the object has a large influence on the error of white balance.

SUMMARY OF THE INVENTION

With such situations in mind, the present invention has been made and its object is to provide a white balance correcting device for an image sensing apparatus which can provide an accurate white balance regardless of what color combination the color filters of the image sensor have, while causing the white balance sensor to operate with its output at a proper level.

To achieve the above-described object, according to the invention, in embodiments thereof, the white balance correcting device for an image sensing apparatus is constructed in the following ways (1) to (6):

(1) Use is made of a white balance sensor having color filters of the same combination as a predetermined combination of color filters which an image sensor has, signal processing means for inputting and processing an output of the image sensor and an output of the white balance sensor in a time-sharing manner, white balance coefficient computing means for computing a white balance coefficient on the basis of the processed signal output from the white balance sensor and processed by the signal processing means, and correcting means for correcting the white balance of color signals output from the image sensor and processed by the signal processing means on the basis of an output of the white balance coefficient computing means.

(2) In the way (1), means is provided for generating a timing signal to cause the reading of the white balance sensor and the computing of the white balance coefficient to be performed during the vertical blanking period.

(3) In the way (1) or (2), means is provided for controlling the amount of light entering the white balance sensor.

(4) In the way (1), means is provided for generating a timing signal to cause the reading of the white balance sensor to be performed during the horizontal blanking period and the computing of the white balance coefficient to be performed during the vertical blanking period.

(5) In the way (4), means are provided for detecting the maximum value of the output of the white balance sensor and for controlling the interval of reading of the white balance sensor in accordance with the detected value of the maximum value detecting means.

(6) In the way (2) or (4) or (5), means is provided responsive to excess of the amount of light entering the white balance sensor above a predetermined value for sweeping away the charges of the white balance sensor during the horizontal scanning.

According to the above-described ways (1) to (6), color filters of any combination may be used for the image sensor without failing to make the outputs of the image sensor and the white balance sensor equivalent in spectral characteristic to each other, and these outputs are allowed to be processed by the common signal processing circuit, thus making it possible to insure that the white balance is corrected with high accuracy.

Further, according to, in particular, the above-described ways (3), (5) and (6), despite the brightness of the object, the white balance sensor produces an output of proper level, in other words, operates in the proper exposure condition.

DETAILED DESCRIPTION OF THE PREFERRED

The invention is next described in connection with embodiments thereof.

Figure 1:
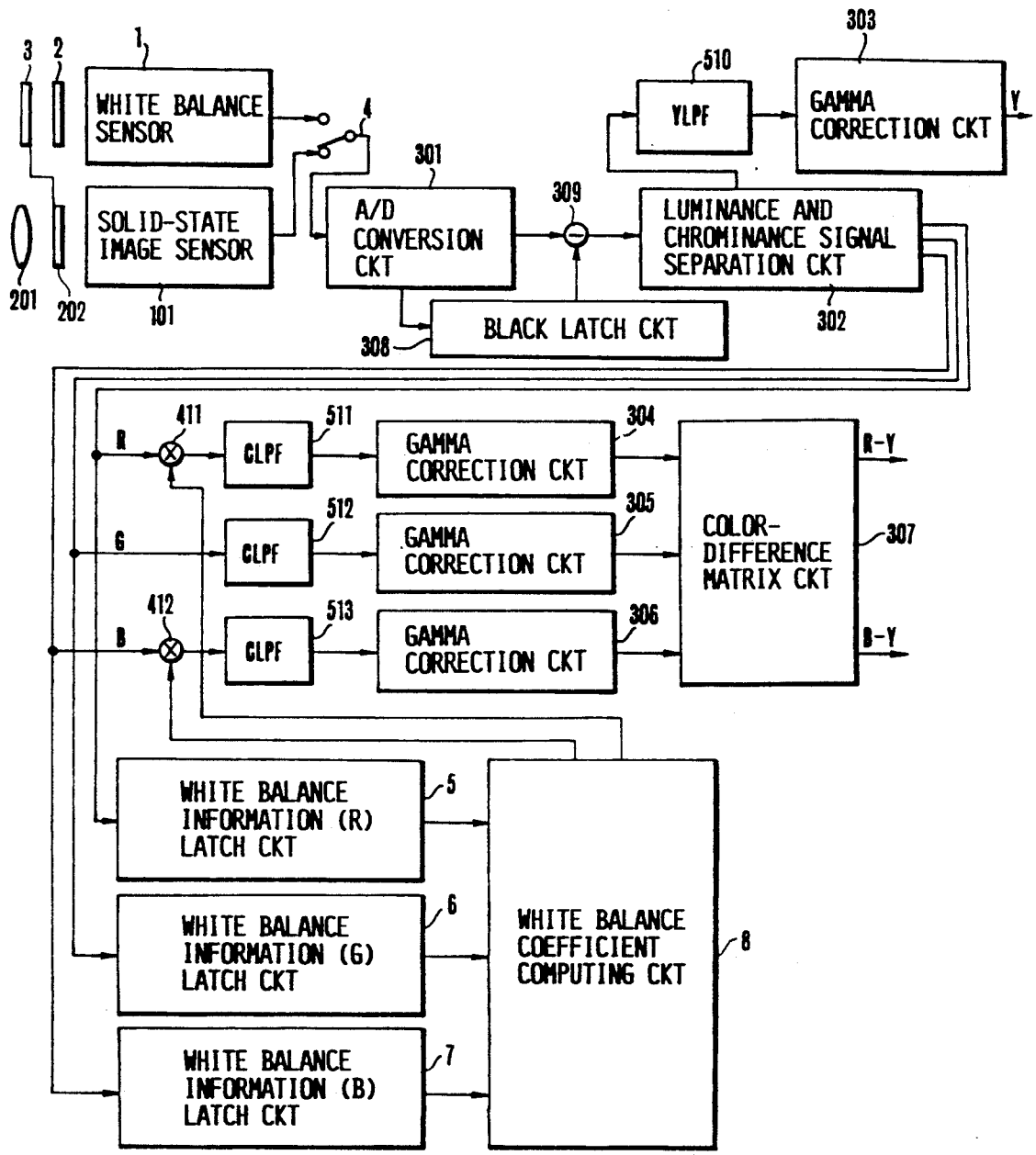
FIG. 1 is a block diagram of a first embodiment of the invention.

FIG. 1 in schematic diagram shows a first embodiment of a white balance correcting device for a video camera according to the invention. The video camera includes a lens 201, a diaphragm 202, a solid-state image sensor 101 and an A/D conversion circuit 301. The light with which an image is formed on the solid-state image sensor 101 by the lens 201 is converted into an electrical signal by the solid-state image sensor 101, which is then converted into a digital signal by the A/D conversion circuit 301. A black latch circuit 308 renews and holds the reference signal of the solid-state image sensor 101, i.e., the signal of black, for every one horizontal scanning period (hereinafter abbreviated to "1H" period). The output of the black latch circuit 308 is subtracted from the output of the A/D conversion circuit 301 by a subtracting circuit 309. From the output of the subtracting circuit 309, a luminance signal and color signals R, G and B are separated by a luminance and chrominance signal separation circuit 302. The luminance signal, after its band is limited by a low-pass filter 510, is supplied to a gamma correction circuit 303 where a gamma correction is factored. Its output is used as the luminance signal. The color signals R and B are multiplied by coefficients in passing through multiplying circuits 411 and 412 respectively. The bands of the color signals are limited by low-pass filters 511, 512 and 513 respectively. Their outputs are supplied to respective gamma correction circuits 304, 305 and 306 for the color signals. From the gamma-corrected color signals R, G and B, color-difference signals R−Y and B−Y are formed by a color-difference matrix circuit 307. The foregoing circuit cooperates with the white balance correcting device in such a manner that the gains of the signal lines for R, G and B are controlled in accordance with the color temperature of the light source to obtain color signals in good white balance.

The white balance correcting device comprises a white balance sensor 1 having color filters of the same color combination as that of the solid-state image sensor 101, a diffusing optical system 2, a diaphragm 3 (means for controlling the amount of light entering the white balance sensor 1) operatively connected to the diaphragm 202 of the image sensing system to control the exposure so that the white balance sensor 1 does not saturate, a switch 4 for selectively switching inputs to the A/D conversion circuit 301 in a time-sharing manner, as it moves to the position of the white balance sensor 1 only when white balance information is read, white balance information latch circuits 5, 6 and 7 for latching, as white balance information, the three primary color signals R, G and B separated from the signal of the white balance sensor 1 by the luminance and chrominance signal separation circuit 302 as the signal from the white balance sensor 1 is read, and a white balance coefficient computing circuit 8 receptive of the outputs of the white balance information latch circuits 5, 6 and 7 for computing and holding a coefficient for white balance.

Figure 2:
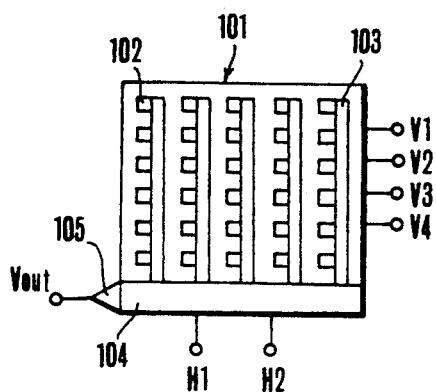
FIG. 2 is a plan view of an array of cells in the interline type CCD.

FIG. 2 is a plan view for explaining the interline type CCD as an example of the solid-state image sensor 101. In FIG. 2, the interline type CCD 101 that is the solid-state image sensor comprises photodiodes 102 on which the charges obtained by converting the light are stored, a vertical CCD 103 for transferring the charges shifted from the photodiodes 102 by one line vertically in each H blanking period, and transfer electrodes V1 to V4 for the vertical CCD 103. The electrode V1 also serves as a transfer gate for transferring the charges of the odd-numbered lines of the photodiodes 102 to the vertical CCD 103. The electrode V3, too, serves as a transfer gate for the photodiodes 102 of the even-numbered lines. The vertical CCD 103 is driven by 4-phase transfer pulses. The charges are transferred from the vertical CCD 103 by one line in 1H blanking period to a horizontal CCD 104 in which they are then transferred horizontally. Transfer electrodes H1 and H2 of the horizontal CCD 104 are driven by 2-phase pulses. An output amplifier 105 converts the charges into a voltage and produces it at its output terminal Vout.

Figure 3:
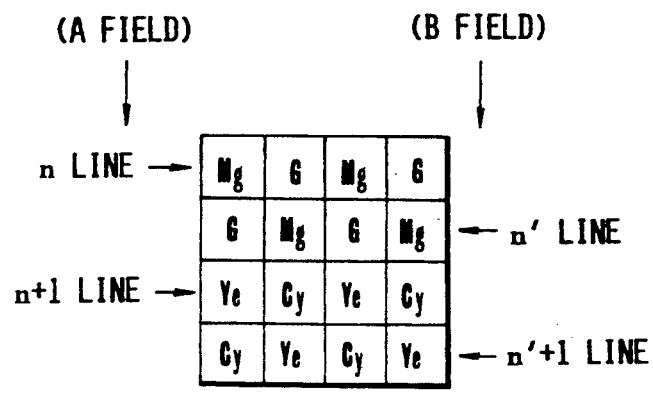
FIG. 3 is a diagrammatic representation of color filters.

FIG. 3 shows an array of color filters in front of the solid-state image sensor. An n line is a repetition of Mg (magenta), G (Green), Mg, G, . . . ; an n+1 line is a repetition of Ye (Yellow), Cy (cyan), Ye, Cy . . . . And, Mg-and-G and Ye-and-Cy invert their orders in each field.

Figure 4:
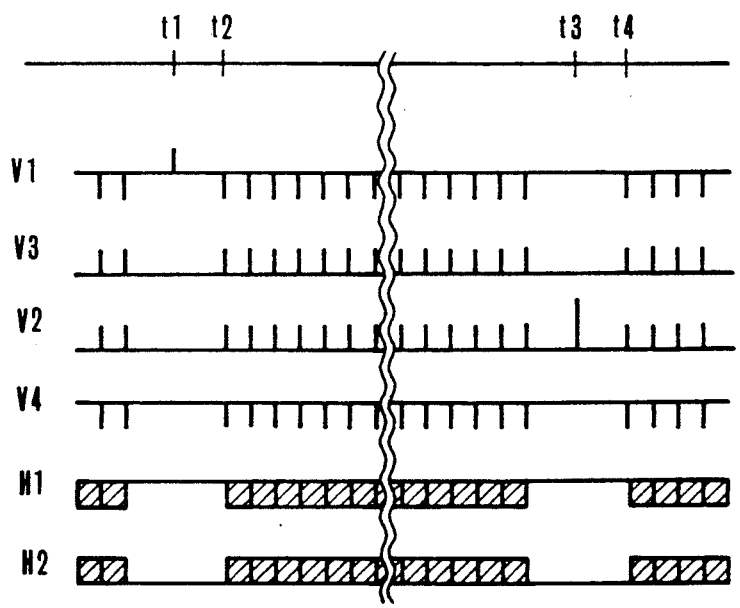
FIG. 4 is a timing chart for driving the interline type CCD.

FIG. 4 is a chart showing the drive timing when picture element information of the solid-state image sensor 101 is read out in a frame reading mode. At a time t1, the electrode V1 changes to high level at which the charges of the photodiodes 102 of the n line are transferred to the vertical CCD 103. In the period from a time t2 to a time t3, those charges are read out. At the time t3, the charges of the n' line are transferred to the vertical CCD 103. From the time t4 on, those charges are read out. In such a manner, reading is carried out. Thereby, the charges corresponding to the Ye, Cy, Mg and G can be read out one picture element by element independently.

Figure 5:
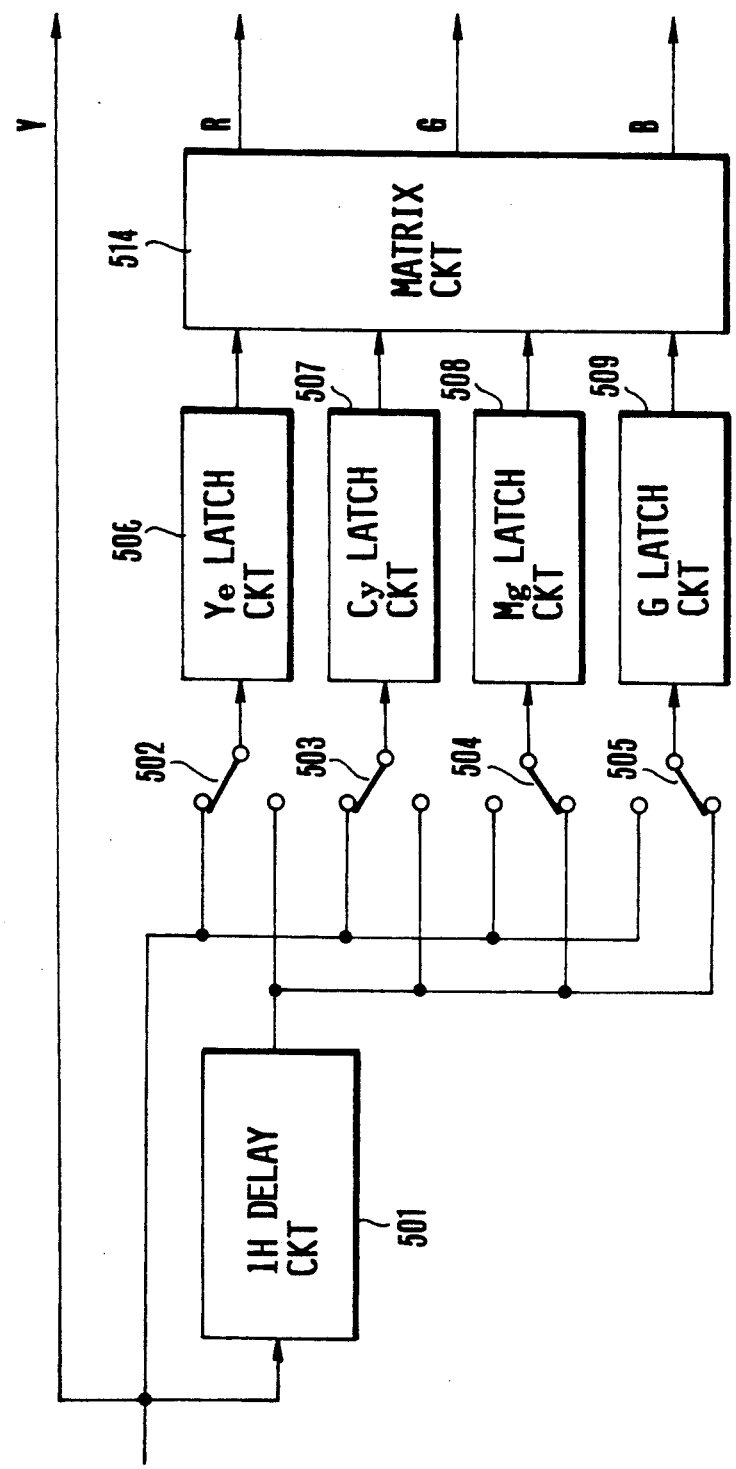
FIG. 5 is a block diagram of the luminance and chrominance signal separation circuit.

FIG. 5 is a block diagram of the luminance and chrominance signal separation circuit 302 of FIG. 1. In FIG. 5, a 1H delay circuit 501 is arranged to obtain a signal delayed from the input signal by 1H period. Switches 502, 503, 504 and 505 change over between the delayed signal and the original signal in each 1H period. A Ye latch circuit 506 latches the Ye signal by a clock of period equal to 2 times that of the clock of the original signal. A Cy latch circuit 507 latches the Cy signal by a clock of phase deviated by a half period from that of the clock for the Ye latch circuit 506. An Mg latch circuit 508 latches the Mg signal likewise. A G latch circuit 509 latches the G signal by a clock of phase deviated by a half period from that of the clock for the Mg signal. As is understandable from FIG. 3, for the (n+1)st line, the G and Mg signals are obtained from the 1H delayed signal. To the (n+1)st line, therefore, the switches 502 and 503 are set in their positions for the original signal, while the switches 504 and 505 are set in their positions for the delayed signal. And, for the (n+2)nd line, the switches 502 and 503 are moved to the opposite position for the 1H delayed signal, while the switches 504 and 505 to the opposite position for the original signal. For this reason, the signals for the four colors Ye, Cy, Mg and G are always obtained at the same time. These four color signals are computed by a matrix computing circuit 514 to extract the three primary color signals for R, G and B. In the case of the filter structure as shown in FIG. 3, as the luminance signal (Y), the original signal is used without further processing.

Figure 6:
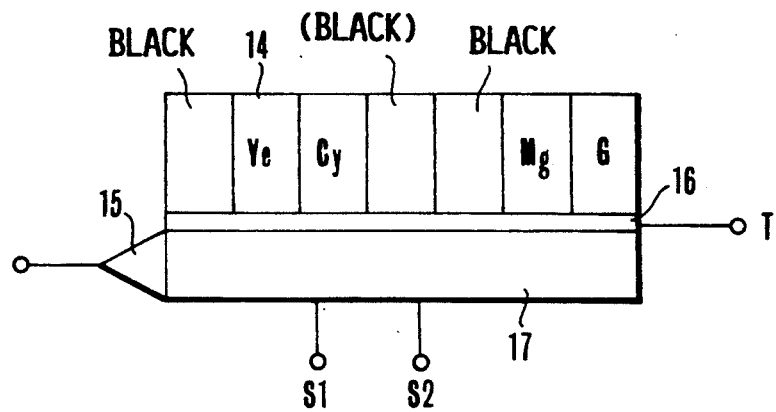
FIG. 6 is a diagrammatic representation of the construction of the white balance sensor of the same embodiment.

FIG. 6 is a schematic view illustrating an example of construction of the white balance sensor 1 in the form of a CCD line sensor.

In FIG. 6, a light receiving portion 14 is constructed from seven picture elements for black, Ye, Cy, (black), black, Mg and G. The black becomes a reference of zero level for signals. The (black) is a dummy picture element provided for the purpose of convenience of the reading timing and is not actually used as a signal. It should be noted that though in the present embodiment, the number of picture elements to be used is limited to a minimum, a far greater number of picture elements may be used, of course. The charges of the light receiving portion 14 are transferred past a transfer gate 16 to a horizontal CCD 17. The transfer gate 16 has an electrode T. The horizontal CCD 17 has transfer electrodes S1 and S2. The transferred charges are converted into voltages by an output amplifier 15.

Figure 7:
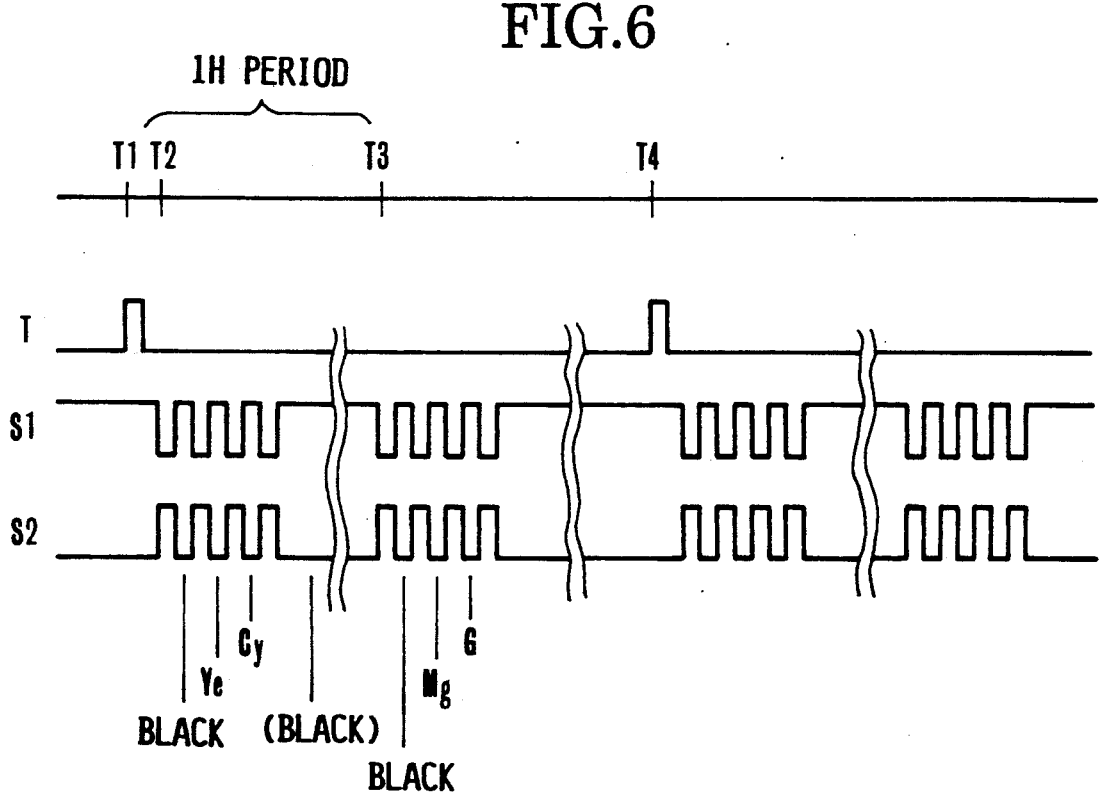
FIG. 7 is a timing chart for driving the white balance sensor.

FIG. 7 is a chart illustrating an example of drive timing of the white balance sensor 1. At a time T1, the level of a transfer gate pulse T becomes high, causing the charges of the light receiving portion 14 to be transferred to the horizontal CCD 17. From a time T2 onward, driving of the horizontal CCD 17 then starts. So, signals are produced successively in the order of black, Ye and Cy. After the driving of the horizontal CCD 17 has once been stopped, the driving is started again at a time T3 by 1H period later than the time T2. From the time T3 onward, signals are produced successively in the order of black, Mg and G. In such a manner, all the signals are output in division two times. By using this method, these signals can be obtained in the same order and in the same timing as the outputs of the solid-state image sensor 101. Therefore, the luminance and chrominance signal separation circuit 302 for processing the output of the solid-state image sensor 101 can be used in common for extracting the color signal from the white balance sensor 1. The accumulating time of charges for the white balance sensor 1 is determined by the time space from the moment at which it has once been read out to the moment at which it is read out for the next time. That is, in FIG. 7, the time space from the moment T1 to the moment T4 represents that accumulating time.

Figure 8:
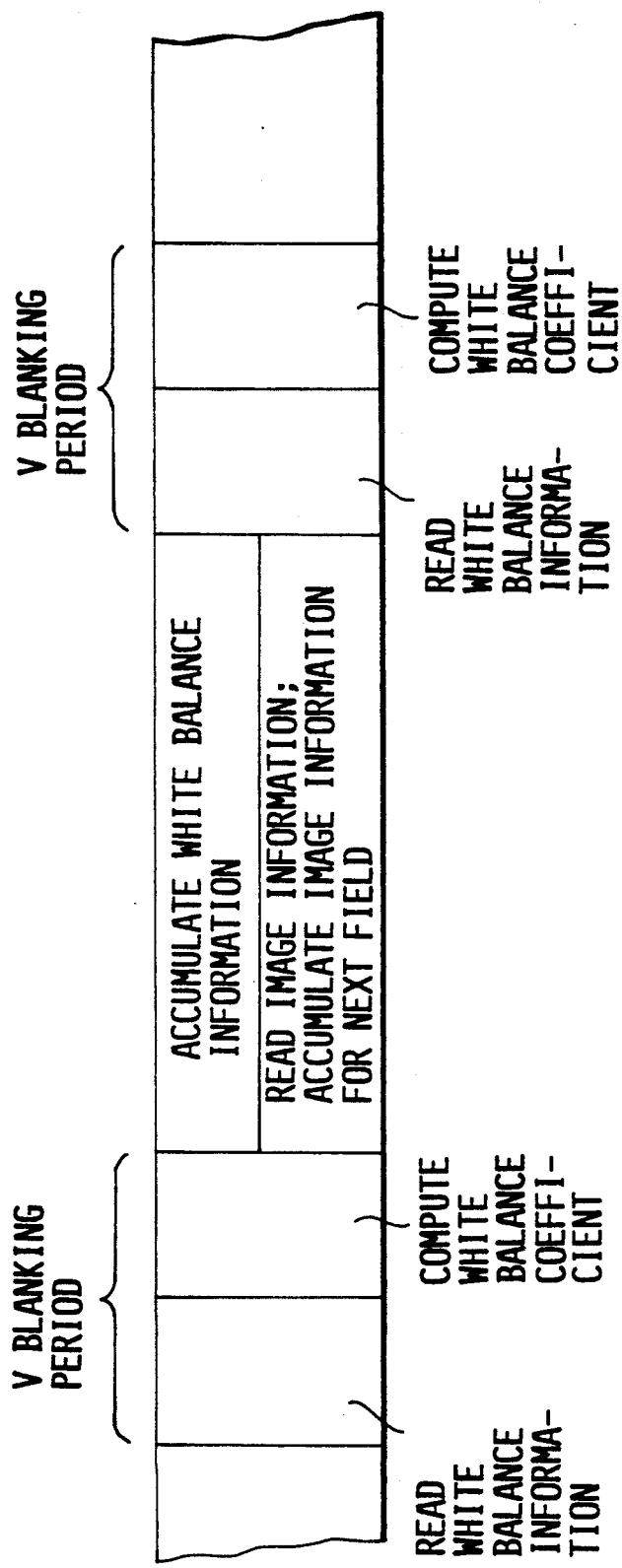
FIG. 8 is a diagram of a sequence of operations of correcting the white balance of the first embodiment.

FIG. 8 is a sequence diagram for the white balance correcting operation in the present embodiment. In the vertical blanking period (hereinafter abbreviated to the "V" blanking period), the switch 4 is connected to the white balance sensor 1. By a timing signal output from a timing signal generating means (not shown), white balance information is read from the white balance sensor 1 in such a way as shown in FIG. 8. The signal read from the white balance sensor 1 is converted to digital form by the A/D conversion circuit 301, wherein the black signal first read in the first H is latched in the black latch circuit 308, which, as the reference signal, is subtracted from the later read Ye and Cy signals. The Ye and Cy signals read in this order are sent to the luminance and chrominance signal separation circuit 302. In the second H, likewise, a black signal is followed by Mg and G signals in sequence, which are likewise sent to the luminance and chrominance separation circuit 302. In the luminance and chrominance separation circuit 302, by the method described in connection with FIG. 5, the signals obtained from the white balance sensor 1 are separated into the three primary color signals by exactly the same process as for the signals obtained from the solid-state image sensor 101. The three primary color signals obtained from the white balance sensor 1 are latched in the white balance information latch circuits 5, 6 and 7. During the V blanking period as sensed by a timing signal output from the timing signal generating means (not shown), the white balance coefficient computing circuit 8 computes the data of the R, G and B obtained from the sensor 1 to determine such a coefficient that when a white object is imaged, the ratio of the color signals R, G and B becomes 1:1:1. This coefficient is held during the subsequent effective period in which the image is read out. In the multiplying circuits (means for correcting the white balance) 411 and 412, the color signals R and B are multiplied by this coefficient. Earlier by a predetermined time than the termination of the V blanking period, the switch 4 is changed over to the position for the solid-state image sensor 101, and the image information stored in the solid-state image sensor 101 is read out. Along with this, the white balance information and image information to be used in the next field start to accumulate.

In such a manner, in the present embodiment, the sensor for obtaining image and the white balance sensor are made exactly equal to each other in the combination of color filters, and the circuit for color separation is used in common. The use of these features provides a possibility of using the same dyes in the white balance sensor 1 as those in the solid-state image sensor 101. Therefore, even if, as the solid-state image sensor 101, a 4-color sensor of complementary colors or the like is used, the spectral characteristics of the R, G and B in the point of time at which the three primary color signals are separated can be made perfectly coincident with each other. Also since the conduction of light to the white balance sensor 1 is by the diffusing optical system, there is no possibility of increasing the influence of an object in question on the error of white balance. In a case where another solid-state image sensor 101 which is associated with three color filters such as Ye, G and Cy ones is employed, the white balance sensor 1 has to be replaced by a one having Ye, G and Cy color filters. It is needless to say that, like this, for any given solid-state image sensor, there is need only to alter the color combination of the sensor for white balance to conformance with the color coding filter of the former sensor. Also, though in the present embodiment, the white balance information to be latched is what has been retrieved to the state of the three primary color signals, it is also possible, of course, to vary the circuitry in such a way that the signals of the preceding state to the three primary color signals are latched.

Figure 9:
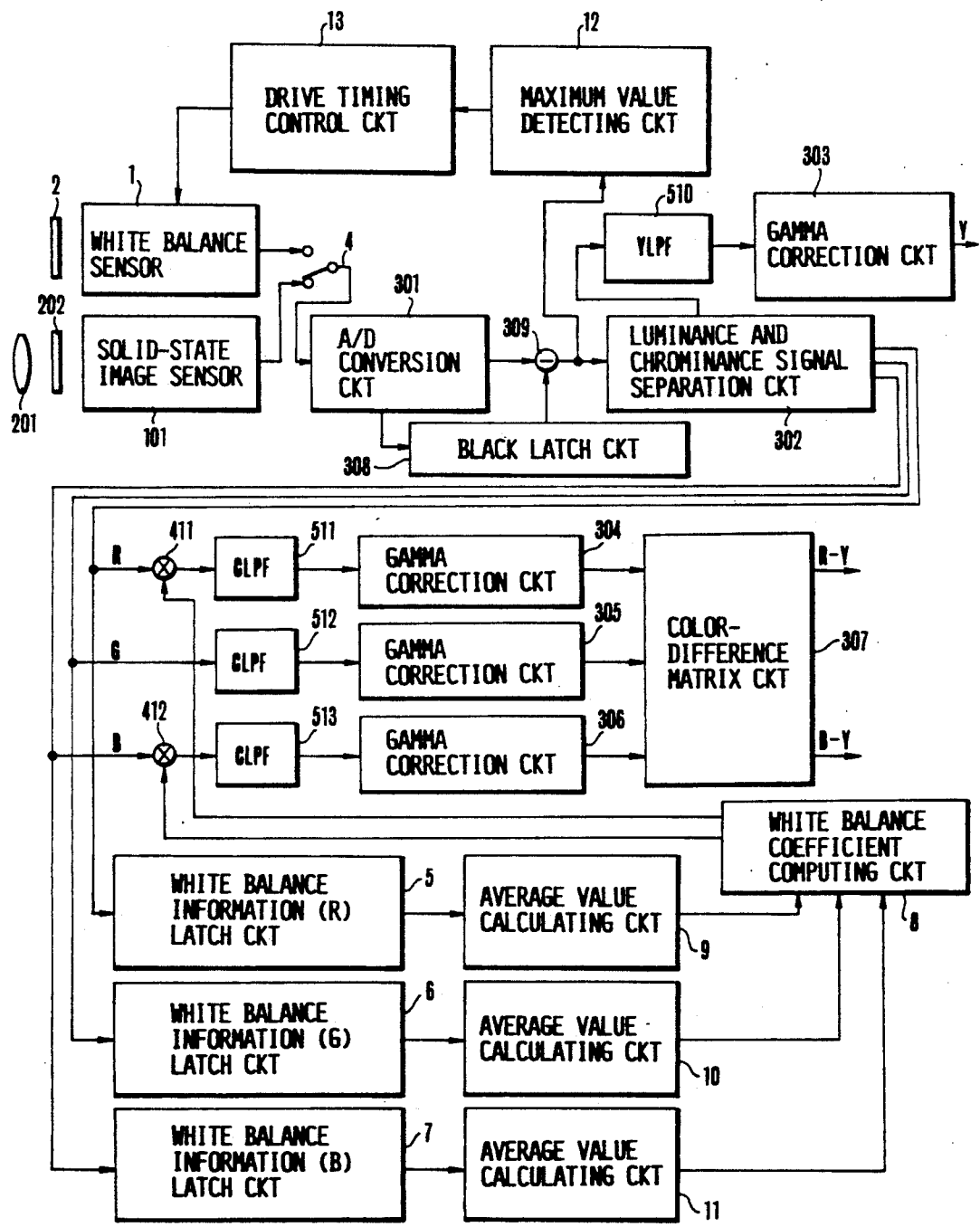
FIG. 9 is a block diagram of a second embodiment of the invention.
Figure 10:
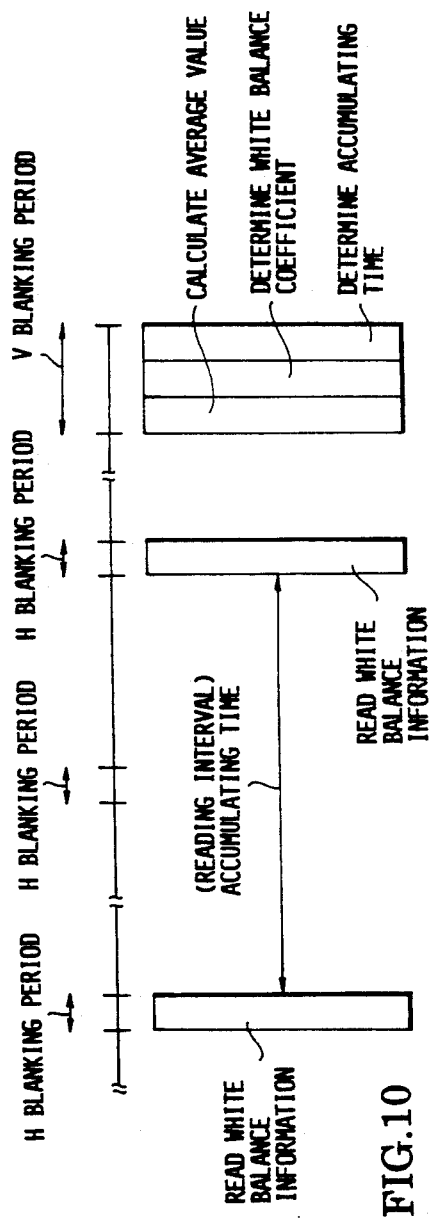
FIG. 10 is a diagram of a sequence of operations of the second embodiment.
Figure 11:
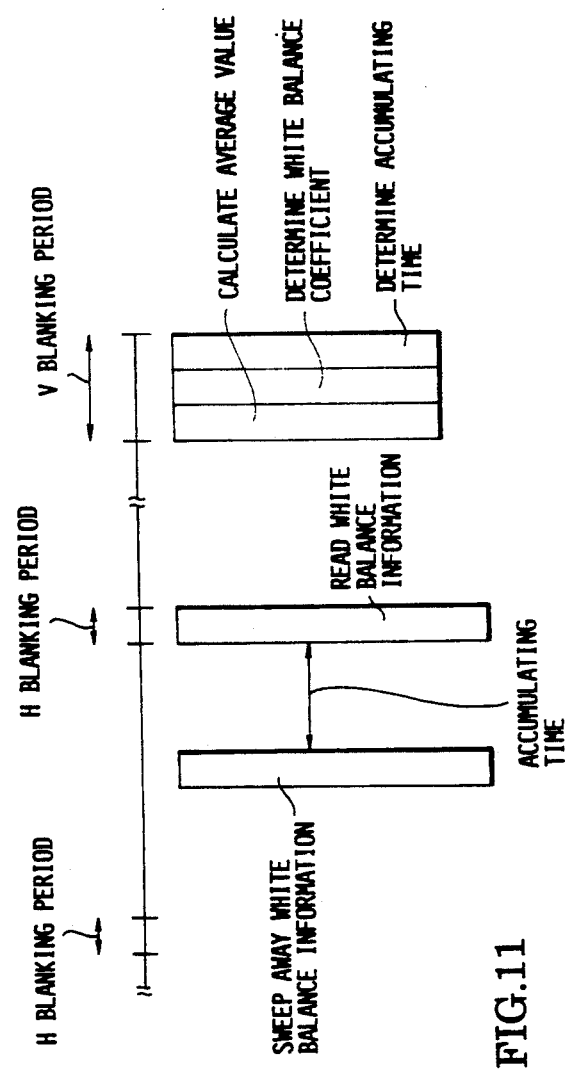
FIG. 11 is a diagram of another sequence of operations of the same embodiment.

FIG. 9 is a block diagram of the second embodiment of the invention wherein to prevent the white balance sensor 1 from being saturated when the exposure is controlled, the diaphragm 2 is not used, but means is provided for controlling the accumulating time for the white balance sensor 1. In FIG. 9, the R, G and B outputs separated from the output of the white balance sensor 1 each are averaged over one field period by respective average value calculating circuits 9, 10 and 11. The maximum value of the signal output from the subtracting circuit 309 is detected by a maximum value detecting circuit 12. A drive signal is sent from the timing generating means (not shown) to the white balance sensor 1 in a timing controlled by a drive timing control circuit 13 (means for controlling the reading intervals) in such a manner that the accumulating time of the white balance sensor 1 is controlled so as not to saturate. FIG. 10 and FIG. 11 are charts illustrating the control of the accumulating time, the reading timing, etc., in the present embodiment. In the present embodiment, the charges accumulated on the white balance sensor 1 are read out once in several Hs depending on the light amount. The reading is carried out in the horizontal blanking period (hereinafter abbreviated to the "H" blanking period). That is, for one time in several Hs, the switch 4 is changed over to the position for the white balance sensor 1 so that likewise as in the first embodiment, white balance information is read out. This information is integrated by the average value calculating circuits 9, 10 and 11. And, average values of values read out the equal number of times to the number of Hs and integrated by the average value calculating circuits 9, 10 and 11 are computed at the beginning of the V blanking period. Subsequently, based on these values of R, G and B, from the R. G and B signals obtained from the average value calculating circuits 9 to 11 in response to the timing signal output from the timing generating means (not shown), the white balance coefficient computing circuit 8 carries out computation of G/R and G/B and then determines such a white balance coefficient that the ratio of the color signals R, G and B in the white object becomes 1:1:1. The result is held so as to be used in the next field. FIG. 11 is a chart for explaining the accumulating time control in a case where even only 1H period gives too long a exposure time to avoid saturation of the white balance sensor 1 (the amount of incident light is above a predetermined value). For such a high brightness, while the switch 4 remains in the position for the solid-state image sensor 101, a means for sweeping away the charges operates the white balance sensor 1 to perform a reading operation during a horizontal scanning, as the charges are transferred to, for example, the electric power source line. And, the charges accumulated during the interval from the moment at which the charges have been swept away to the moment at which the next H blanking starts are read out in the H blanking period. The operation in the V blanking period is similar to that of FIG. 10. The accumulating time is controlled on the basis of information output from the maximum value detecting circuit 12 by the drive timing control circuit 13 so that the white balance sensor 1 does not saturate. When the output of the maximum value detecting circuit 12 gets closer to the saturation output of the white balance sensor 1, the reading interval is narrowed to shorten the accumulating time. Conversely when the output of the maximum value detecting circuit 12 gets smaller than a predetermined value, the reading interval is widened.

According to the present embodiment, the necessity of using the diaphragm solely for the white balance sensor 1 is obviated, and a minimization of the size and a low cost become possible.

As has been described above, according to the invention, the same combination of color filters is used for the image sensor and the white balance sensor, and the outputs of the image sensor and the white balance sensor are treated by the same signal processing means. In the image sensing apparatus with the image sensor having its color filters chosen to any color combination, an accurate white balance correction can be performed.

Also, as to the white balance sensor, because the received amount of light is controlled, or the reading interval and the charge accumulating time are controlled in accordance with the intensity of incident light, saturation does not take place. Hence, the proper white balance correction can be performed with high reliability.

What is claimed is:

1. An image sensing apparatus comprising an image sensor having a predetermined combination of a plurality of color filters, said image sensor producing a time-sequential image signal which sequentially includes a plurality of color components corresponding to the plurality of color filters, a white balance sensor having the same combination of color filters as that of said image sensor, said white balance sensor producing a time-sequential sensed signal which sequentially includes a plurality of color components corresponding to the plurality of color components of said time-sequential image signal produced by said image sensor, said white balance sensor being independent of said image sensor, signal processing means for inputting and processing the time-sequential image signal produced by said image sensor and the time-sequential sensed signal produced by said white balance sensor in a time-sharing manner, white balance coefficient computing means for computing a white balance coefficient on the basis of a signal output from said white balance sensor and processed by said signal processing means, and correcting means for correcting the white balance of color signals output from said image sensor and processed by said signal processing means on the basis of an output of said white balance coefficient means.

2. An image sensing apparatus according to claim 1, further comprising timing generating means for causing reading of said white balance sensor and computation of the white balance coefficient to be performed during a vertical blanking period.

3. An image sensing apparatus according to claim 1 or claim 2, further comprising means for controlling the amount of light entering said white balance sensor.

4. An image sensing apparatus according to claim 1, further comprising timing generating means for causing reading of said white balance sensor to be performed during a horizontal blanking period and computation of the white balance coefficient to be performed during a vertical blanking period.

5. An image sensing apparatus according to claim 4, further comprising maximum value detecting means for detecting a maximum value of the output of said white balance sensor, and means for controlling the reading interval of said white balance sensor in accordance with the value detected by said maximum value detecting means.

6. An image sensing apparatus according to claim 4, further comprising means for sweeping away charges of said white balance sensor during a horizontal scanning when the amount of light entering said white balance sensor is above a predetermined value.

7. An image sensing apparatus comprising:
 (a) a color image sensor, said color image sensor producing a time-sequential image signal which sequentially includes a plurality of color components;
 (b) a color temperature sensor which is independent of said color image sensor, said color temperature sensor producing a time-sequential sensed signal which sequentially includes a plurality of color components corresponding to the plurality of color components of said time-sequential image signal produced by said image sensor;

(c) processing means for selectively processing said time-sequential image signal produced by said color image sensor and said time-sequential sensed signal produced by said color temperature sensor; and (d) white balance control means for controlling the white balance of color signals output from said color image sensor which have been obtained through said processing means on the basis of outputs of said color temperature sensor which have been obtained through said processing means.

8. An apparatus according to claim 7, wherein said color image sensor includes a color separation filter in front thereof.

9. An apparatus according to claim 8, wherein said color separation filter consists of a plurality of color filters.

10. An apparatus according to claim 9, wherein said color temperature sensor includes a plurality of color filters, said plurality of color filters included in said color temperature sensor being the same color filters as said plurality of color filters included in said color separation filter.

11. An apparatus according to claim 7, wherein said processing means alternatively processes the outputs of said color image sensor and said color temperature sensor.

12. An apparatus according to claim 7, wherein said white balance control means includes gain control means for controlling the gains of a plurality of color signals included in the output of said color image sensor which has been obtained through said processing means.

13. An image sensing apparatus, comprising:
(a) an image sensor having a predetermined combination of color filters;
(b) a white balance sensor having the same combination of color filters as that of said image sensor;
(c) maximum value detecting means for detecting a maximum value of the output of said white balance sensor;
(d) timing generating means for causing reading of said white balance sensor to be performed during a horizontal blanking period;
(e) control means for controlling the reading interval of said white balance sensor in accordance with the value detected by said maximum value detecting means;
(f) signal processing means for receiving and processing an output of said white balance sensor in a time-sharing manner;
(g) white balance coefficient computing means for computing a white balance coefficient on the basis of a signal output from said white balance sensor and processed by said processing means; and
(h) correcting means for correcting the white balance of color signals output from said image sensor and processed by said processing means on the basis of an output of said white balance coefficient computing means.

14. An image sensing apparatus comprising:
(a) a color image sensor for producing a time-sequential image signal which sequentially includes a plurality of color components;
(b) a color temperature sensor for producing a time-sequential sensed signal which sequentially includes a plurality of color components corresponding to the plurality of color components of said time-sequential image signal produced by said image sensor;
(c) interval control means for controlling an outputting interval of said color temperature sensor by using a signal output from said color temperature sensor;
(d) processing means for selectively processing said time-sequential image signal produced by said color image sensor and said time-sequential sensed signal produced by said color temperature sensor; and
(e) white balance control means for controlling the white balance of color signals produced by said color image sensor which have been obtained through said processing means on the basis of a signal output from said color temperature sensor.

15. An image sensing apparatus, comprising:
(a) an image sensor having a predetermined combination of color filters;
(b) a white balance sensor having the same combination of color filters as that of said image sensor;
(c) timing generating means for causing reading of said white balance sensor to be performed during a horizontal blanking period;
(d) sweeping means for sweeping away charges of said white balance sensor during a horizontal scanning when the amount of light entering said white balance sensor is above a predetermined value;
(e) signal processing means for receiving an processing an output of said white balance sensor in a time-sharing manner;
(f) white balance coefficient computing means for computing a white balance coefficient on the basis of a signal output from said white balance sensor and processed by said processing means; and
(g) correcting means for correcting the white balance of color signals output from said image sensor and processed by said processing means on the basis of an output of said image sensor and processed by said processing means on the basis of an output of said white balance coefficient computing means.

16. An image sensing apparatus comprising:
(a) a color image sensor;
(b) a color temperature sensor;
(c) timing generating means for causing reading of said color temperature sensor to be performed during a horizontal blanking period;
(d) sweeping means for sweeping away charges of said color temperature sensor during a horizontal scanning according to a signal output from said color temperature sensor;
(e) processing means for selectively processing an output signal of said color image sensor and the signal output from said color temperature sensor; and
(f) white balance control means for controlling the white balance of the output signal of said color image sensor which has been obtained through said processing means on the basis of the signal output from said color temperature sensor.

17. An image sensing apparatus comprising:

(a) a color image sensor;
(b) a color temperature sensor;
(c) sweeping means for sweeping away charges of color temperature sensor scanning according to a signal output from said color image sensor which has been obtained through said processing means on the basis of the signal output from said color temperature sensor.

18. An image sensing apparatus comprising:
(a) a color image sensor for producing a time-sequential image signal which sequentially includes a plurality of color components;
(b) a color temperature sensor for producing a time-sequential sensed signal which sequentially includes a plurality of color components corresponding to the plurality of color components of said time-sequential image signal produced by said image sensor, said color image sensor and said color temperature sensor being individually driven;
(c) processing means for selectively processing said time-sequential image signal produced by said color image sensor and said time-sequential sensed signal produced by said color temperature sensor; and
(e) white balance control means for controlling the white balance of color signals produced by said color image sensor which have been obtained through said processing means on the basis of a signal output from said color temperature sensor.

19. An image sensing apparatus comprising:
(a) a color image sensor for producing a time-sequential image signal which sequentially includes a plurality of color components;
(b) a color temperature sensor for producing a time-sequential sensed signal which sequentially includes a plurality of color components corresponding to corresponding to the plurality of color components of said time-sequential image signal produced by said image sensor;
(c) a switching circuit arranged to input said time-sequential image signal produced by said color image sensor and said time-sequential sensed signal produced by said color temperature sensor for selectively outputting them;
(d) processing means for processing an output signal of said switching circuit; and
(e) white balance control means for controlling the white balance of color signals produced by said color image sensor which have been obtained through said processing means on the basis of a signal output from said color temperature sensor.

20. An image sensing apparatus comprising:
(a) a color image sensor for producing a time-sequential image signal which sequentially includes a plurality of color components;
(b) a color temperature sensor for producing a time-sequential sensed signal which sequentially includes a plurality of color components corresponding to the plurality of color components of said time-sequential image signal produced by said image sensor;
(c) an analog-to digital converter for selectively converting said time-sequential image signal produced by said color image sensor and said time-sequential sensed signal produced by said color temperature sensor;
(d) digital processing means for processing an output digital signal of said analog-to-digital converter; and
(e) white balance control means for controlling the white balance of a digital signal corresponding to color signals produced by said color image sensor which have been obtained through said digital processing means on the basis of a digital signal corresponding to a signal output from said color temperature sensor.

* * * * *